Jan. 17, 1967    K. A. SIELOFF    3,298,665
JACK
Filed April 8, 1965    2 Sheets-Sheet 1
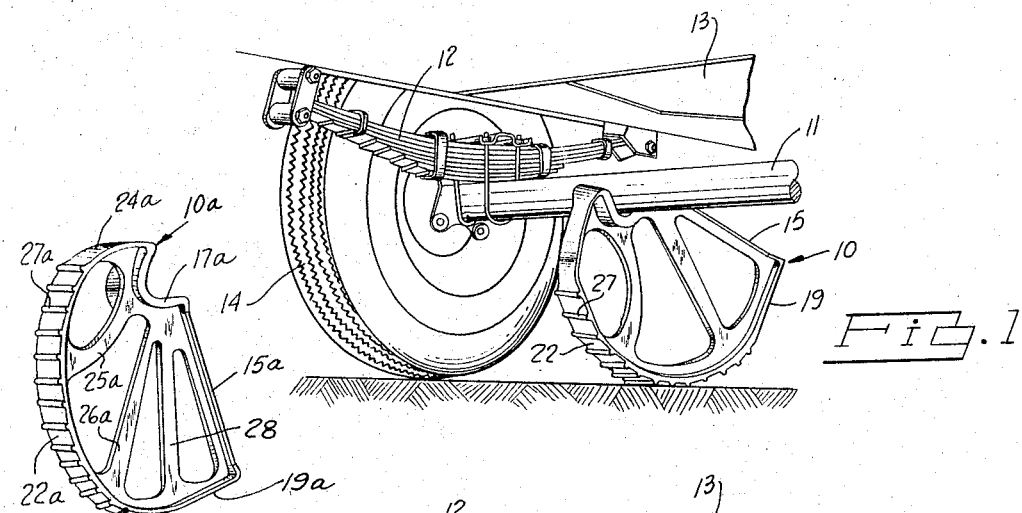
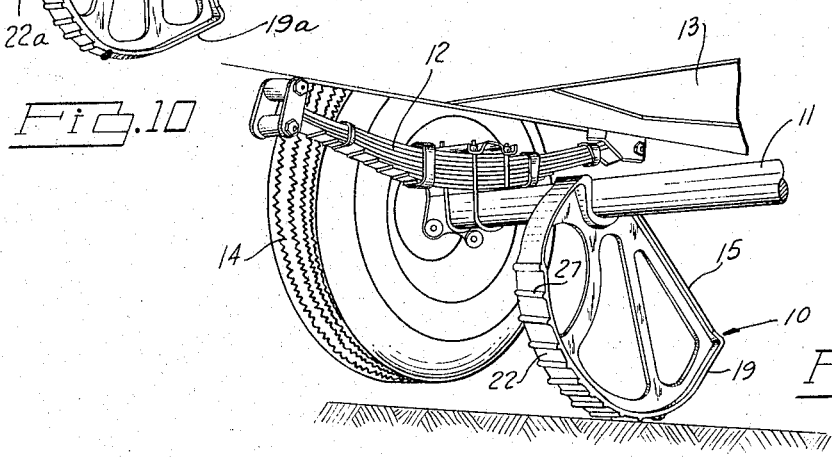
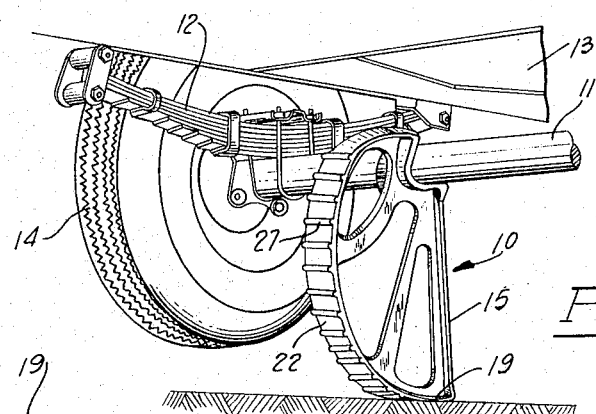
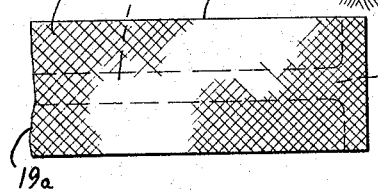
INVENTOR.
KENNETH A. SIELOFF
BY
Donnelly, Mentag & Harrington
ATTORNEYS

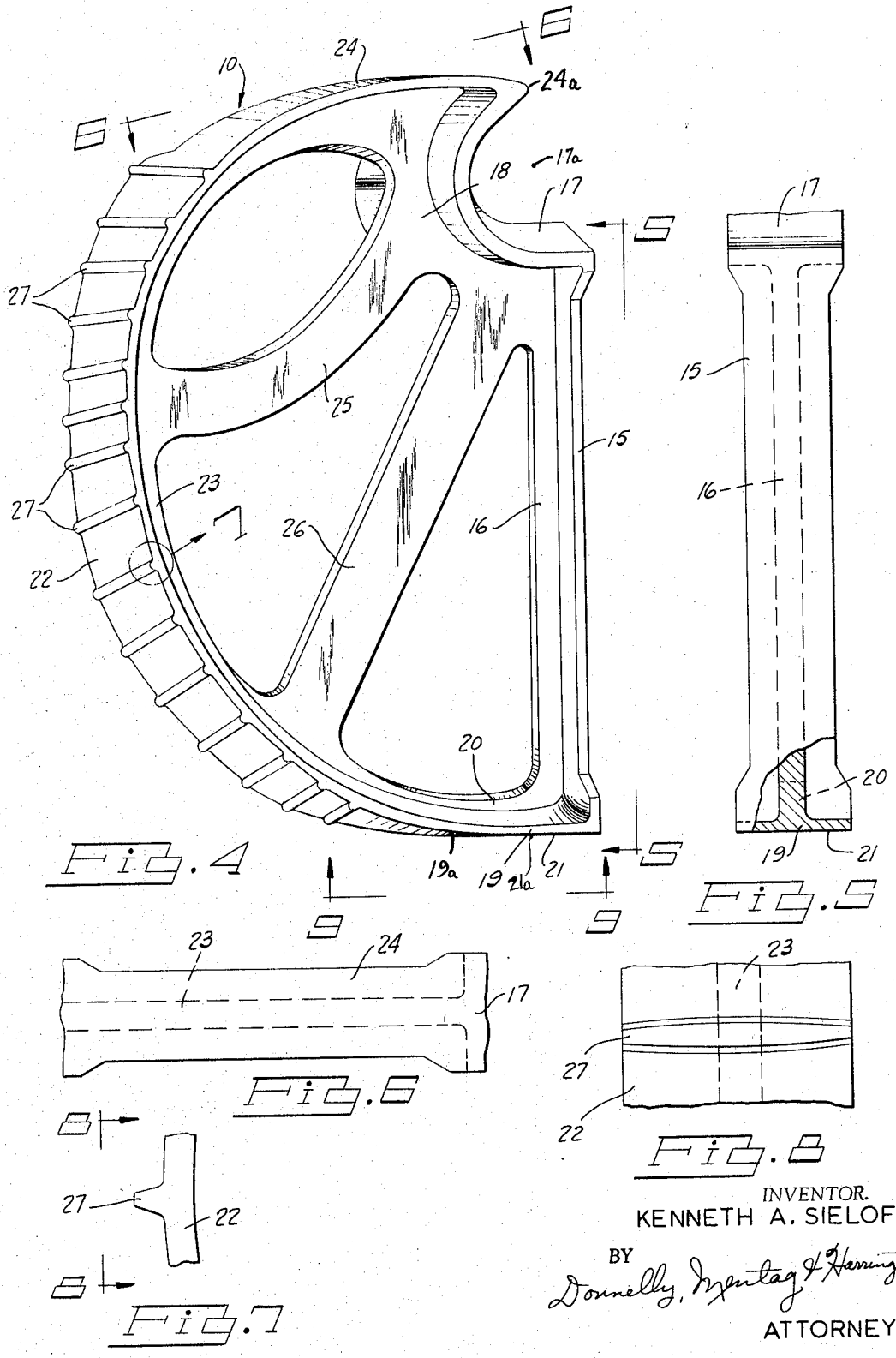

United States Patent Office 3,298,665
Patented Jan. 17, 1967

3,298,665
JACK
Kenneth A. Sieloff, Troy, Mich., assignor to Conlan-Sieloff Industries, Inc., Birmingham, Mich., a corporation of Michigan
Filed Apr. 8, 1965, Ser. No. 446,582
2 Claims. (Cl. 254—94)

This invention relates generally to a vehicle jack, and more particularly, to a novel and improved quick operating jack especially adapted for vehicle trailers or the like.

The use of various type vehicle trailers has increased greatly in the past few years. For example, the number of people owning boat trailers, mobile homes, camp trailers, horse trailers, utility trailers, and farm equipment trailers, has increased. On week ends and holidays the highways are crowded with vacationers towing boat trailers, camp trailers, or the like, on their way to their favorite water or hunting spot. Some of these people are unfortunate to have a flat tire on the highway, and, heretofore, this meant unloading, either partially or wholly, the trailer in order to repair or replace the flat tire. Such a situation is time-consuming and discouraging to the parties involved and is an unpleasant beginning for what was to be a happy occasion.

Accordingly, in view of the foregoing, it is an important object of the present invention to provide a novel and improved jack which is adapted to quickly and easily lift a boat trailer, camp trailer, or the like, to an elevated position where a flat tire may be quickly and safely changed.

It is another object of the present invention to provide a novel and improved vehicle jack which operates on a non-mechanical principle with no moving parts.

It is a further object of the present invention to provide a novel and improved jack which is especially adapted for use with vehicle trailers, and which is simple and compact in construction, economical of manufacture, and efficient and fast in operation.

It is still another object of the present invention to provide a novel and improved jack for a vehicle trailer, or the like, which is made from a one piece construction with no moving parts, and which may be cast from a lightweight metal as aluminum so as to eliminate any need for adjusting, repairing or replacing parts of the jack, and which is easy to store when not in use.

It is still a further object of the present invention to provide a novel and improved jack for a vehicle trailer or the like, which is adapted to be placed under the axle of the vehicle trailer, whether the axle is round or square, and the vehicle is then driven forwardly or backwardly a short distance, whereby said wheel of the vehicle is raised automatically.

It is another object of the present invention to provide a novel and improved jack which comprises a frame having a spirally shaped outer periphery, an axle engaging pivot socket on one end of the spiral periphery, and a ground engaging foot or support pad on the other end of the spiral periphery.

Other objects, features and advantages of this invention will be apparent from the following detailed description, appended claims, and the accompanying drawings.

In the drawings:

FIG. 1 is a fragmentary, perspective view of a portion of a vehicle trailer, and showing the jack of the present invention placed under the axle of the trailer in an initial position adjacent to the vehicle wheel to be lifted;

FIG. 2 is a view similar to FIG. 1, and showing the vehicle wheel in a partially raised position with the jack in an intermediate position between the initial and final raised positions;

FIG. 3 is a view similar to FIG. 1, and showing the vehicle wheel and the jack in the fully raised positions;

FIG. 4 is an enlarged perspective view of an illustrative jack made in accordance with the principles of the present invention;

FIG. 5 is a fragmentary, side elevational view of the structure illustrated in FIG. 4, taken along the line 5—5 thereof, and looking in the direction of the arrows;

FIG. 6 is a fragmentary, plan view of the structure illustrated in FIG. 4, taken along the line 6—6 thereof, and looking in the direction of the arrows;

FIG. 7 is a fragmentary, enlarged side elevational view of the structure of FIG. 1, taken within the circle marked "7";

FIG. 8 is a left side elevational view of the structure illustrated in FIG. 7, taken along the line 8—8 thereof, and looking in the direction of the arrows;

FIG. 9 is a fragmentary, bottom plan view of the structure illustrated in FIG. 4, taken along the line 9—9 thereof, and looking in the direction of the arrows; and FIG. 10 is a perspective view of a second embodiment of the invention.

Referring now to the drawings, and in particular to FIGS. 1 through 4, the numeral 10 generally designates a one-piece construction jack made in accordance with the principles of the present invention. In FIGS. 1 through 3, the numeral 11 indicates the axle of a vehicle trailer which may be lifted by the jack 10. The axle 11 is supported by means of the usual vehicle structure including the leaf spring 12 on one side of the vehicle trailer which is generally indicated by the numeral 13. The numeral 14 indicates the wheel and tire assembly operatively mounted on the axle 11 which is to be raised for repairing or replacing of a flat tire.

As best seen in FIGS. 3, 4 and 5, the jack 10 comprises an upright or vertical supporting leg comprising the outer elongated flange 15 which is provided with an integral supporting brace 16. It will be seen, that the members 15 and 16 provide a substantially T-shaped in cross section supporting upright. This upright is disposed in the vertical position, as shown in FIGS. 3 and 4, during a load supporting or jacking operation.

As shown in FIGS. 4 and 5, the jack 10 further includes a semicircular pivot support socket 17 which is adapted to receive the axle 11. The pivot socket 17 is substantially semi-circular in shape and includes the outer flange 17 which is an integral continuation of the flange 15 and which is supported by a vertical brace or strut 18 which is arcuately curved and which is integrally formed on the inner face of the pivot socket 17. The portion of the socket 17 adjacent the upper end of the upright flange 15 is a partially flat surface on which the axle 11 rests when the jack is in the fully raised position shown in FIG. 9.

It will be seen that the members 15 and 17 appear as a continuous flange. In one illustrative embodiment the width of the flange 15 was about 1¼". The width of the pivot socket flange in said embodiment was increased to a larger dimension as shown in FIG. 5 to about 2". As shown in FIG. 5, the width of the lower end of the flange 15 is increased to approximately the same width as the pivot seat 17, and in said embodiment it was about 2".

As shown in FIGS. 4, 5 and 9, the upright flange 15 is integrally connected to a flange 19 which forms a support foot or rest pad that engages the ground or other supporting surface when the jack is in the fully raised position shown in FIG. 3. The flange 15 is illustrated as being of the same width at the lower portion thereof as the flange 19. The flange 19 is provided with the integral support brace or strut 20. It will be seen that the support brace 20 provides a T-shaped cross section structure for the ground engaging flange portion 19.

As shown in FIG. 9, the ground engaging portion 19 may be roughened on the lower surface 21 in any suitable manner, as for example, it may be knurled to provide a means for a friction forming engagement with the ground or surface on which the vehicle trailer is disposed. As shown in FIG. 4, the lower or outer surface 21 of the flange 19 is substantially flat to form an efficient ground engaging surface or rest pad.

As shown in FIGS. 4 and 9, the flange 19 is integral with an arcuately shaped flange 22 which extends from the end 19a of the rest pad outward and around, and upwardly to the upper end of the flange of the pivot socket 17. The arcuately shaped flange 22 is backed or supported by an integral, arcuately shaped brace or strut 23 which is integrally connected to the braces 18 and 20. Integrally formed on the outer face of the flange 22, are a plurality of evenly spaced apart, ground engaging teeth 27 which function as more fully described hereinafter.

As shown in FIG. 4, the upper end 24 of the flange 22 has a plain surface without any teeth 27. The flange portion 24 may be slightly narrower than the rest of the flange 22. The flange 22 is substantially spirally shaped with increasing radii from point 24a counterclockwise, relative to axis 17a. The leading edge 24a of the flange 22, as shown in FIG. 4, is disposed on a radius line relative to the axis of rotation 17a of the socket 17, and the outer periphery of the flange 22 then extends outwardly to the left as shown in FIG. 4, and downwardly and around back to the edge 19a of the rest pad 19 in a spiral manner. The axis of rotation 17a is disposed in substantial vertical alignment with the center 21a of the rest pad when the jack is in the raised position of FIG. 3. As best seen in FIG. 4, the jack 10 includes a pair of support braces or struts 25 and 26 which are integrally formed with, and interconnected between, the braces 18 and 23.

In use, the jack 10 is placed in the position shown in FIG. 1 with the axle 11 of the vehicle trailer disposed in the pivot socket 17. The jack 10 is then rotated clockwise as viewed in FIG. 1, in a pivoting manner about the axle 11 until the teeth 27 on the outer flange 22 engage the supporting surface or the ground on which the vehicle is disposed. The vehicle is then moved forward, or to the right, as viewed in FIGS. 1 and 2, and the shaft 11 will pivot about the point of contact of the spiral flange 22 on the ground or supporting surface. It will be seen that continued forward movement of the vehicle will rotate the jack 10 in a clockwise direction until it is in the position shown in FIG. 3, wherein the flange 15 is in the vertical supporting position and the wheel 14 will have been raised from the surface of the ground. The jack 10 could be disposed 180° to the position shown in FIGS. 1 through 3, and the vehicle would then be moved in a backward direction until the jack rotates to the raised position. The teeth 27 engage the ground or other supporting surface and permit continued rotation of the jack without slippage. The teeth 27 are continued down to a position adjacent the point 19a where the flat, rest portion of the flange 19 begins.

FIG. 10 illustrates a modification of the invention in which the parts similar to the first embodiment have been marked with corresponding reference numerals followed by the small letter "a." In the embodiment shown in FIG. 10, the upright flange 15a has been disposed in an angular position relative to the vertical disposition of the flange 15 of the first embodiment. An additional support brace or strut 28 has also been employed in the embodiment of FIG. 10. The embodiment of FIG. 10 has an increased area on the foot or rest pad 19a because of the outward extension and increased length of the flange 19a. The flange 15a is disposed outwardly from the vertical position between the outer edge of the pivot socket 17a and the base 19a, at an acute angle, to provide an increased flat portion on the rest pad. The enlarged rest pad provides a positive indication to the driver when the jack has been rotated to the raised position to warn the driver to stop.

Experience has shown that the jack of the present invention is an efficient jack for vehicle trailers or the like. It may be made from cast aluminum, and it will be seen that the one-piece, no moving part construction provides a jack which has no upkeep and which is easy to store. The jack can be used on round or square vehicle axles. It will be understood that when the wheel assembly 14 has been moved to the raised position shown in FIG. 3, that the brakes on the vehicle will be set to hold the vehicle in position. An actual lightweight embodiment has been tested and recommended for loads up to two tons. The jack of the present invention is adapted to be used on any type road surface.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A one-piece construction rotary jack for engagement with an axle of a vehicle, comprising:
    (a) a support leg having a T-shaped cross section and comprising an outer elongated flange provided with an integral support brace;
    (b) a semi-circular pivot support socket adapted to receive a vehicle axle and comprising a boundary flange which is an integral continuation of the flange on said support leg, and an arcuately curved integral support brace on the inner face of the pivot socket;
    (c) one end portion of said socket adjacent the upper end of the flange on the support leg having a partially flat surface on which a vehicle axle rests when the jack is in a fully raised position;
    (d) the lower end of said support leg flange being integrally connected to one end of a flange disposed perpendicularly thereto and which forms a part of a support foot that engages a supporting surface when the jack is in a fully raised position;
    (e) said support foot further including an integral brace to provide a T-shaped cross section structure;
    (f) said jack including an elevating means comprising an arcuately spiral shaped flange which extends from the other end of said support foot to the other end of the support socket;
    (g) said arcuately spiral shaped flange being supported by an integral arcuately shaped brace which is also integral with the brace on the support socket and the support foot;
    (h) the outer surface of said arcuately spiral shaped flange being provided with a plurality of evenly spaced apart, ground engaging teeth extending from said support foot to a point adjacent the support socket; and,
(i) the axle contacting surface of said support socket being disposed transverse to the vertical plane of rotation of the jack when the jack is operated to provide a vertical elevating movement to a vehicle axle when the elevating spiral shaped flange of the jack is rotated over a supporting surface to move the axle to a position vertically disposed over the support leg.
2. The structure defined in claim 1, wherein:
(a) said support foot is extended outwardly beyond the vertical axis of the support leg when the jack is in a raised position.

References Cited by the Examiner

UNITED STATES PATENTS

| 634,100 | 10/1899 | Wise | 254—94 |
| 1,931,033 | 10/1933 | Peter et al. | 254—94 |
| 2,001,467 | 5/1935 | Madigan | 254—94 |

FOREIGN PATENTS

| 388,308 | 2/1933 | Great Britain. |
| 484,521 | 5/1938 | Great Britain. |

WILLIAM FELDMAN, *Primary Examiner.*

OTHELL M. SIMPSON, *Examiner.*